Figure 1:
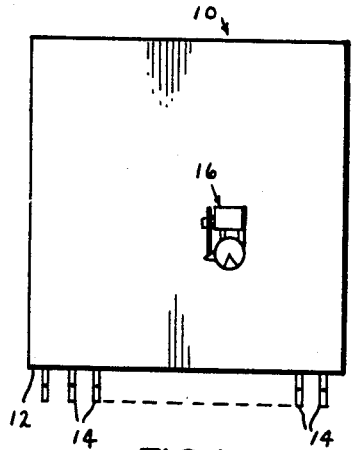

Nov. 13, 1962

L. G. BROWN 3,064,131

SOLAR OPERATED LOUVER APPARATUS

Filed Dec. 21, 1959

3 Sheets-Sheet 1

LEMUAL G. BROWN
INVENTOR.

BY Loyal J. Miller
ATTORNEY

Nov. 13, 1962    L. G. BROWN    3,064,131
SOLAR OPERATED LOUVER APPARATUS
Filed Dec. 21, 1959    3 Sheets-Sheet 2

LEMUAL G. BROWN
INVENTOR.

BY
ATTORNEY

Nov. 13, 1962  L. G. BROWN  3,064,131
SOLAR OPERATED LOUVER APPARATUS
Filed Dec. 21, 1959  3 Sheets-Sheet 3

INVENTOR.
LEMUAL G. BROWN
BY
*Saya G. Miller*
ATTORNEY

United States Patent Office
3,064,131
Patented Nov. 13, 1962

3,064,131
SOLAR OPERATED LOUVER APPARATUS
Lemual G. Brown, P.O. Box 8777, Britton, Okla.
Filed Dec. 21, 1959, Ser. No. 860,887
3 Claims. (Cl. 250—203)

The present invention relates generally to louvered apparatus and more particularly to a louver control.

The present invention is a continuation-in-part of an application filed by me in the United States Patent Office on December 16, 1957, for Solar Operated Louver Apparatus now Patent Number 2,917,795.

Many office and industrial buildings are now, or, are being equipped with louvers for covering the windows or openings therein, thereby providing a means for controlling the amount of light entering the building as well as providing some protection for glazed openings during stormy weather. These louvers comprise a plurality of blades or slats of metallic, or other suitable material, arranged vertically. The louvers are each pivotally mounted adjacent their respective ends and, when closed one vertical edge portion of each preceeding blade overlaps the adjacent edge portion of each succeeding blade. Such a louvered apparatus may have the louvers or blades thereof positioned for admitting passage of substantially all of the light rays falling thereon, and, conversely, the louvers may be closed for shutting out substantially all of the light rays. Such adjustments are highly desirable particularly where the apparatus is used for controlling the amount of sunlight striking a large glazed area such as an office building, or the like, wherein a maximum amount of light is desired, and in which the direct rays of sunlight are objectionable. Time controlled devices have been connected with such louvered apparatus whereby the louvers are moved toward an open or closed position in accordance with a predetermined selected time. This type of installation is fairly satisfactory but requires that the timing, or selected times the apparatus is actuated, be changed in accordance with the seasons. Furthermore, a time control for louvered apparatus does not provide for cloudy or overcast skies wherein it may be desired to leave the louvers in open position to admit a maximum of the available light.

It is, therefore, the principal object of the present invention to provide a solar control for a louver apparatus wherein the louvers are vertically positioned.

A similarly important object is to provide a solar control which will progressively open or close the blades of vertically mounted louvers and permit a maximum amount of sunlight to pass therebetween and yet shield the louver-covered opening from the direct rays of sunlight.

Another object of the invention is the provision of a control of this class which, being responsive to the intensity of sunlight, will maintain the vertically mounted louvers of a louver-covered opening in maximum light admitting position on dark or overcast days.

Another object of the present invention is the provision of time delay means within the solar control for preventing actuation of the control by the momentary passage of shadows.

A further object is to provide a solar control for a louver apparatus which may be selectively operated manually or which may be connected for mechanical or clock control at selected intervals.

Another object is to provide a solar control for a louver apparatus which is not a function of time nor of season and which requires no adjustment or manual regulating after placing the system in operation but which includes switching means whereby the louvers may be rotated to a desired position and maintained in such position.

Another object is to provide a solar control unit wherein delay relays are included to prevent a fanning action of the louvers as a result of a rapid fluctuating light level and to automatically synchronize any louver operating power unit with the solar control unit.

Another important object of the present invention is the provision of a solar controlled apparatus wherein vertically positioned louvers will be reversed from a light closing position to a light admitting position under predetermined conditions.

The present invention accomplishes these and other objects by providing a first motor and gear means drivably connected with a hemispherical dome housing a light responsive cell. Current amplifying means is interposed between the cell and the motor and connected with a second motor and gear means which is in turn connected with vertically disposed louvers, mounted adjacent a building opening, whereby the current amplifying means actuates the second motor for opening and closing the louvers in response to the intensity of light received by the cell while simultaneously actuating the first motor to rotate the dome in a co-operative direction. The light control amplifying selector automatically reverses the position of the blades under certain conditions for maintaining a constant level of light intensity within the building.

Figure 4:
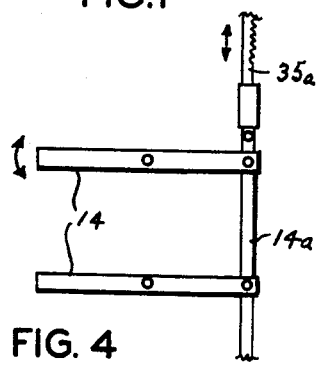
Figure 2:
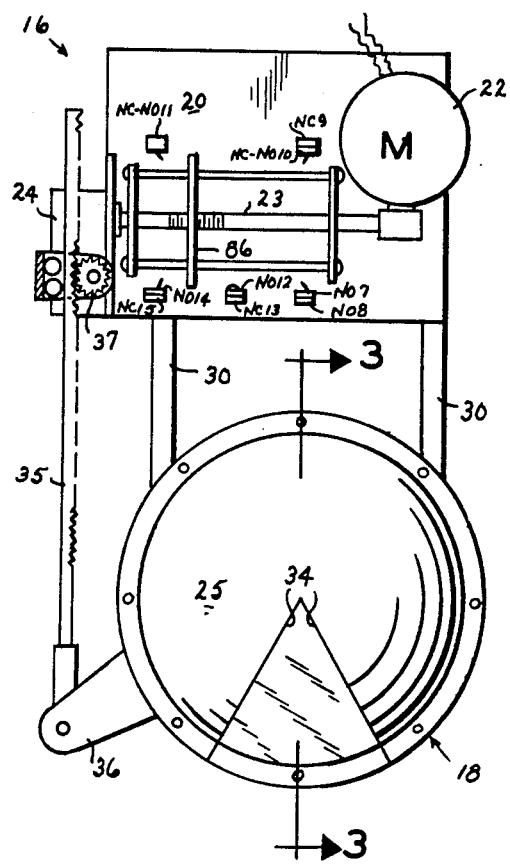
Figure 3:
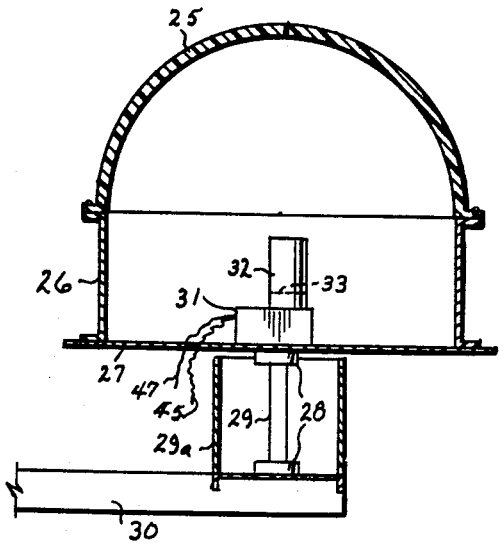
Figure 5:
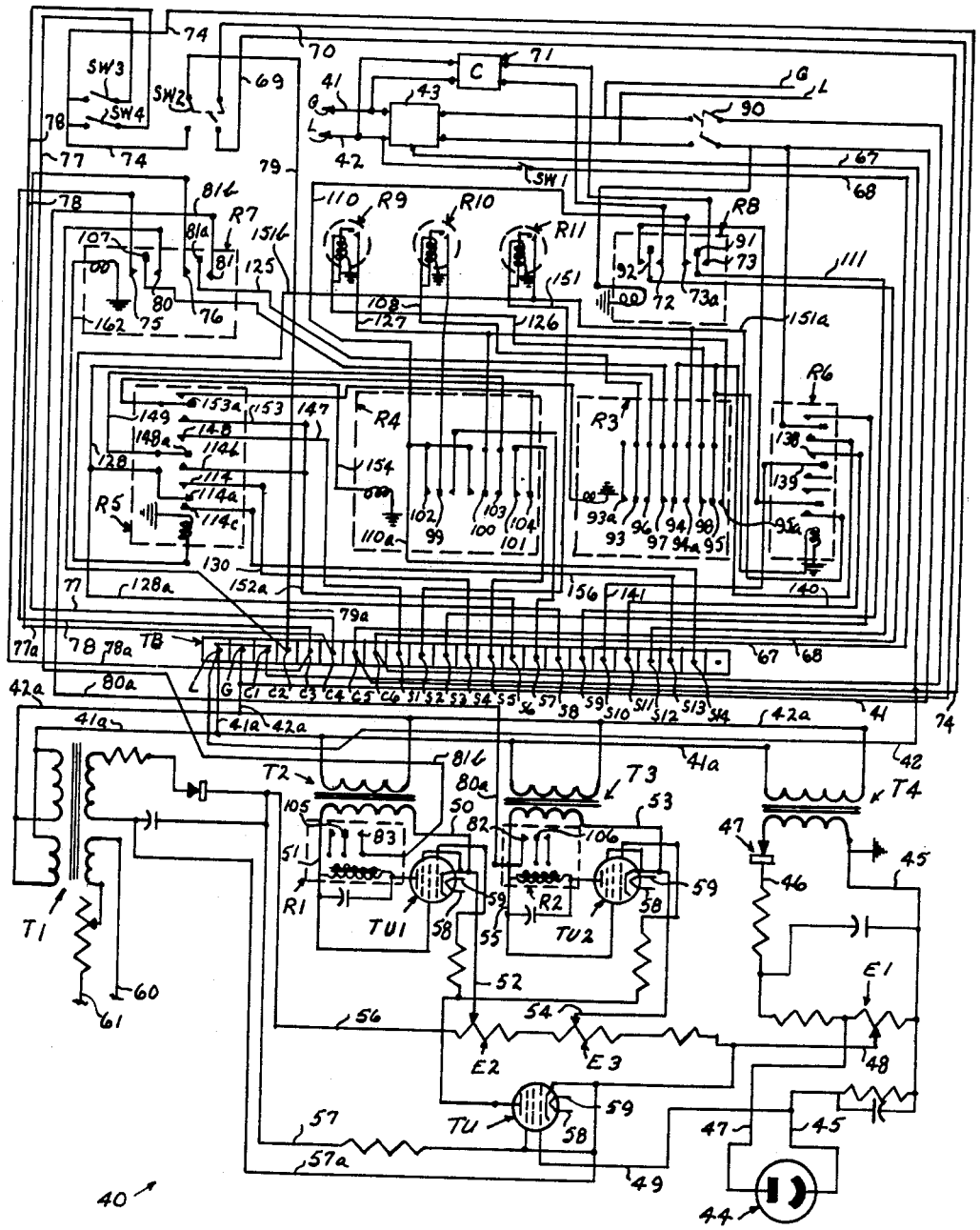
Figure 6:
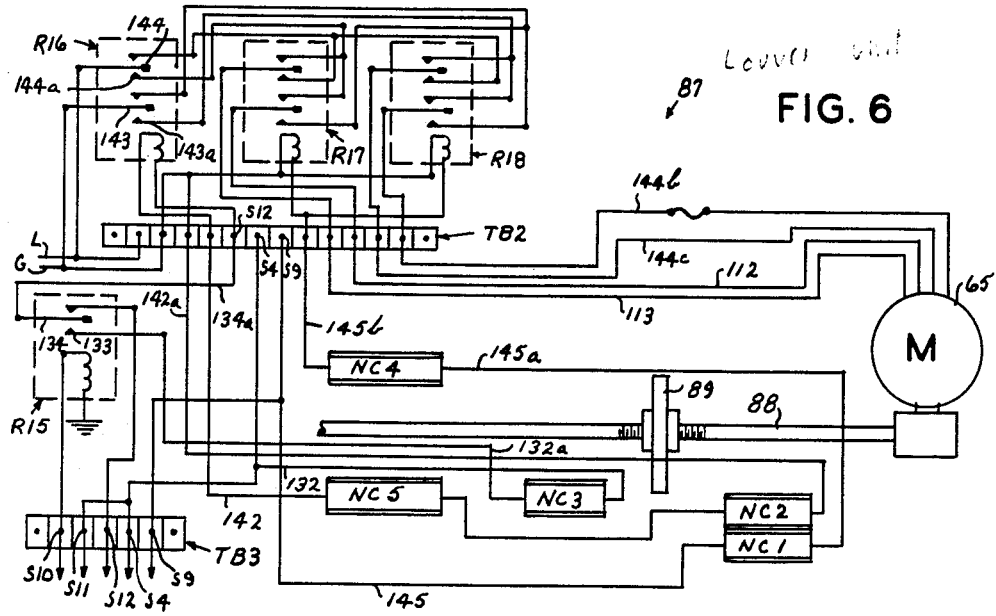
Figure 7:
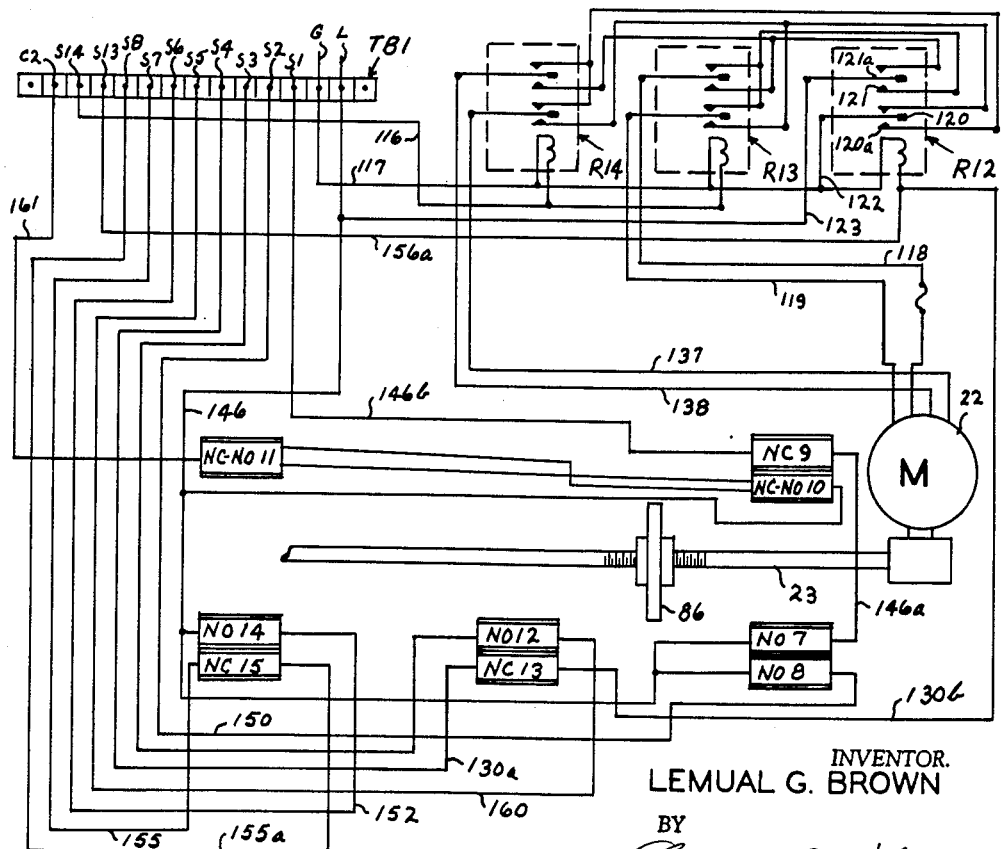

Other objects will be apparent from the following description when taken in conjunction with the accompanying three sheets of drawings, wherein:

FIGURE 1 is a top plan view of a louver equipped building with the device installed thereon;
FIGURE 2 is a top plan view of the solar control unit;
FIGURE 3 is a vertical cross-sectional view taken substantially along line 3—3 of FIG. 2;
FIGURE 4 is a fragmentary plan view illustrating the manner in which the power unit is connected with the louvers for rotating the latter;
FIGURE 5 is a schematic wiring diagram of the electronic light intensity amplifying units and motor control panel;
FIGURE 6 is a schematic wiring diagram of the louver operating power unit connected with its motor; and,
FIGURE 7 is a schematic wiring diagram of the solar control unit connected with its motor.

Like characters of reference designate like parts in those figures of the drawings in which they occur.

In the drawings:
The reference numeral 10 indicates, as a whole, a building having an opening in one side 12 provided with a plurality of vertically disposed louvers 14 arranged in overlapping relation, when fully closed, for shielding the interior of the building from light. For descriptive purposes the building side 12 is to be considered the south side. A solar control unit 16 is preferably mounted on the top of the building, or, at least in a position in which the shadow dome 18, forming a part of the control unit, may face in the direction of the louvers 14. The control unit 16 further includes a base 20 on which a reversible motor 22 is mounted and drivably connected to a screw shaft 23 and a gear train 24. The shadow dome 18 includes a substantially hemispherical upper portion 25, formed by transparent material, such as plastic, and having a flanged edge which is connected to a ring member 26, which is in turn pivotally supported by a base plate 27 centrally connected by bearings 28 to a vertical shaft 29 supported by a bracket 29a, which is in turn connected to the base plate 20 by horizontal support members 30. A photoelectric cell is supported within a suitable receptacle 31 centrally positioned on the upper surface of the base 27 within the dome. An upstanding translucent tube 32 is mounted on the receptacle 31 and a lens 33 is positioned within and at the lower end of the tube 32 which has a focal length equal to its spacing from the cathode of the photoelectric cell so that light or radiation intensity from the sun received by the lens will be directed toward the cell. The plastic dome 25 is coated or painted so that its entire surface is opaque except for a V or gore shaped section, indicated by the lines 34, which is not coated and remains transparent for admitting light to the translucent tube 32 and lens 33. A toothed rack 35 is connected at one end with an arm 36, connected with the dome base 27, and in contact with a pinion 37 driven by the gear train 24 whereby operation of the motor 22, in opposing directions, reciprocates the rack 35 and rotates the dome 18 about the vertical axis of the shaft 29 for the purposes more fully disclosed hereinbelow.

The solar control system comprises four separate units. The control unit 16, including the shadow dome 18, which houses the photoelectric cell, and the motor 22 which operates the dome; a control panel 40, illustrated in FIG. 5, which receives impulses from the photoelectric cell and electronically amplifies them before routing to the control panel relays for operating relays of the solar control unit motor 22 and a louver operating motor or motors; and, a push button control, incorporated in the diagram of FIG. 5, and at least one louver operating power unit 87, illustrated diagrammatically in FIG. 6, which latter operates or moves the louvers in an opening or closing direction.

The electronic and control unit, indicated generally by numeral 40, includes a pair of conductors 41 and 42 connected with a suitable source of electrical energy, not shown, which are in turn connected to points G and L, respectively, of a terminal block TB through an overload and low voltage release 43. From the terminal block TB wires 41a and 42a connect with the primary windings of suitable transformers T1, T2, T3 and T4, for providing the needed voltage to the amplifying unit. The secondary winding of the transformer T4 is connected to the photoelectric cell 44, within the dome 18, by a pair of conductors 45 and 46 through a suitable diode 47, resistors and condensers and a potentiometer E1. The sliding contact 48 of the potentiometer E1 is connected to the plate of a thermionic amplifying pentode tube TU. The lead 45 is in turn connected to one electrode of the tube TU by a wire 49. One side of the secondary winding of the transformer T2 is connected by a wire 50 to the plate of a thermionic tube TU1 and to the sliding contact 52 of a low light level potentiometer E2. The other side of the winding of the transformer T2 is connected to the anode of tube TU1 through the coil of a relay R1 by a wire 51. Similarly, one lead 53, of the secondary winding of the transformer T3, is connected with the plate of thermionic tube TU2 and the sliding contact 54 of a third potentiometer E3, connected in series to the potentiometers E2 and the sliding contact 48 of the potentiometer E1. The other winding of the transformer T3 is similarly connected to the anode of the tube TU2 through the coil of a second relay R2 by a wire 55. The secondary windings of one portion of the transformer T1 are connected through a suitable condenser, resistors and a diode to the potentiometer E2 and one electrode and the plate of the tube TU over wires 56, 57 and 57a, respectively. The windings of the other secondary portion of the transformer T1 are connected to the heaters 58 and 59 of the tubes TU, TU1 and TU2 by wires 60 and 61, respectively. The transformers T1, T2, T3 and T4 isolate the controlling system from any direct connection with the source of power.

The operation of the louver power motor 65 and solar dome motor 22 is controlled by two four-pole double-throw latching relays R3 and R4 of which only three poles of each are used. The system further includes: two triple-pole double-throw relays R5 and R6; two double-pole double-throw relays R7 and R8; and three single-pole single-throw delay type relays R9, R10 and R11. The overload and low voltage release 43 is connected with a monmentary switch SW1 to pull in this release. This switch SW1 is connected in series by a pair of conductors 67 and 68 connected, respectively, to the terminals C6 and C5 in terminal block TB. A pair of wires 69 and 70 connected, respectively, with terminal points C6 and C5 are connected in series with one side of a double-pole "automatic-manual" switch SW2. A standard 24-hour time clock 71, having a reset timer, is connected to the service wires 41 and 42, ahead of the release 43, and which are in turn connected with the contacts 72 and 73 of relay R8. Two push button switches SW3 and SW4, for louver opening operation and louver closing operation, respectively, are connected in series with one side of the switch SW2 and wire 74 which is connected to terminal C1 in the block TB which is bridged to terminal L. The other side of the switches SW3 and SW4 are connected by wires 77 and 78 to terminals C4 and C3, respectively, in the block TB, and contacts 75 and 76 of relay R7 are connected by wires 78a and 77a to terminals C3 and C4, respectively, in the block TB. The remaining pole of switch SW2 is connected to the coil of releay R7 and the terminal C2 in the block TB, by a wire 79. When switch SW2 is closed, the coil is relay R7 is energized which breaks contact between its poles 81a and 107 with points 81 and 80 to make contact with points 76 and 75. Points 80 and 81 of relay R7 are connected with contacts 82 and 83 in the relays R2 and R1, by wires 80a and 81b, respectively.

Closing switch SW2 completes a circuit through the momentary switch SW1, when the latter is closed. This insures that, in case the control unit must be energized, it will be on manual control.

The solar unit motor 22 is controlled by three reversing relays R12, R13 and R14, as illustrated in FIG. 7. The coils and respective contacts of these three relays are actuated by energy originating in the relays R1 and R2 of the electronic amplifying portion of the control or, if the switch SW2 is closed, through the push button switches SW3 and SW4. When the motor 22 is energized, it drives its screw shaft 23 on which a traveling nut 86 is mounted. Thus, as the motor 22 operates; the nut is progressively moved according to the respective rotation of the motor. Nine limit switches are mounted on the base 20, six on one side of the shaft, arranged in three pairs, and indicated by NO7—NO8, NO12—NC13 and NO14 and NC15 and one pair NC9 and NC—NO10 mounted on the opposite side of the shaft adjacent the motor 22 and NC—NO11 mounted on the same side of the shaft remote from the motor. These nine limit switches are each operated by the nut 86 for opening or closing the circuits from the relays in the control panel to determine the manner in which these relays are operated. A brake, not shown, is connected with the motor 22 to load the latter, as needed, for synchronous operation. These nine limit switches and three reversing relays are connected to a terminal block TB1, which have like numbered terminals connected with terminal block TB.

The power unit, indicated generally at 87 (FIG. 6), is similar to the solar control unit in that it includes a motor 65 driving a threaded screw shaft 88 which is in turn connected to a toothed rack 35a (FIG. 4) through a similar gear train, not shown. The rack 35a is connected at one end with a bar 14a extending between and pivotally connected with one edge portion of each respective louver 14. Reciprocation of the rack 35a then pivots the louvers about their vertical axes, as is more fully explained hereinbelow. A traveling nut 89 is threadedly mounted on the shaft and two limit switches NC1—NC2 are mounted on one side adjacent the motor end of the shaft 88 while a limit switch NC5 is mounted at the opposite end portion of the shaft and a switch NC3 is mounted intermediate the limit of travel of the nut 89. A limit switch NC4 is mounted on the shaft support opposite the switch NC5. These five switches are connected into the control circuits through terminal blocks TB2 and TB3 which are in turn connected with the respective numbered terminals of the block TB. A single-pole double-throw relay R15 is included in the power unit circuit (FIG. 6) for opening certain circuits during the louver reversing operation as is more fully explained hereinbelow.

When more than one power unit is needed for controlling louvers on the same elevation, the power units are connected in parallel.

The potentiometers E1, E2 and E3 are adjusted for the desired light level or intensity within the building and opposite the louvers from the source of light. The potentiometer E1 might be termed the bias or limit, between the high and low light level, within which the system operates. The potentiometer E2 determines the low level of control while the potentiometer E3 determines the high light level control. With these three potentiometers set properly, the louvers are closed by operation of the power unit motor 65 when the light level within the building raises above that for which the system is adjusted until the light level within the building has been lowered to the predetermined level at which point the louver power motor 65 and solar control motor 22 are stopped. As the sun moves through its apparent cycle, as the result of the earth's rotation, the louvers are progressively closed to maintain the desired light level within the building. When the louvers have been closed or pivoted about their vertical axes in a closing action, to where the outwardly disposed edges of the louvers are pointing westward or to the left of the building 12, as seen in FIG. 1, and where the louvers make an angle of approximately 35° with respect to the plane of the building wall and wherein further closing of the louvers, to prevent a high level of light intensity to pass therethrough, would close the louvers further resulting in a light level below the preset intensity desired, and yet, wherein such closing would be necessary to prevent glare, the louvers are reversed, or pivoted in the opposite direction, about their vertical axes to a position wherein they form an angle of approximately 35° with respect to the plane of the building wall but in an opposite quadrant. This reversing operation will be set forth in more detail hereinbelow. As the sun moves further along its cycle, the light level within the building will progressively decrease until it reaches a point below the limit set for the system which actuates the power unit 87 for operating the louvers in an opening direction which is the same direction as the louvers were previously pivoted in a closing function. When the light level has decreased beyond the predetermined desired intensity due to the setting of the sun the motor will be actuated for rotating the louvers to a fully opened position where they remain until the light increases at the beginning of the following day which starts a repeat of the hereinabove described cycle. If at any time during the day, sunlight intensity decreases for any reason, the control will actuate the motor to rotate the louvers to an open position where they will remain until sunlight intensity rises above the adjusted value desired within the building wherein the motors will be actuated for closing the louvers to provide the required intensity of illumination. This operation is automatically repeated as often as is necessary for maintaining constant light level.

As an override to the solar control, a manual control unit is incorporated into the system wiring which includes a normally open double-pole switch 90 (FIG. 5) which opens and closes a continuation of the service wires 41 and 42. Opening switch 90 removes control of the system from solar operation and converts it to manual control for effecting any type of operation desired. This switching of the louver operation from solar to manual or mechanical control is accomplished by the following described procedure.

Opening the switch 90 opens the circuit to the coil of relay R8 and, also, opens the power circuit of the electronic photoelectric cell amplifying means. Releasing the coil of relay R8 releases its poles 91 and 92 to make with points 73 and 72, respectively. It will be noted that the power lines L and G are connected to the terminals L and G of terminal block TB2, ahead of the switch 90 so that the power unit 87 will function under manual or mechanical control. Points L and G of terminal blocks TB and TB1 are interconnected.

*Operation*

The operation and function of the system will be more fully understood when broken down and described hereinbelow.

After the system has been installed and ready for the owner to operate, the system would be left with the louvers in fully opened position, as shown in FIG. 1, and the electric energy disconnected. The circuit or control panels illustrated in FIG. 5, are energized by closing the breaker switch or fuse disconnect switch at the main electrical panel, not shown. Switch SW2 is closed which places the system on manual control. The momentary contact switch SW1 is closed which pulls in the holding coil of the overload and low voltage release 43 thus energizing the circuit. The system will then remain energized until a low voltage or overload releases the holding coil. Close the solar-time switch 90 and allow time for the system to heat up and then open the switch SW2, this places the system in automatic operation. Operation of the louvers in the first quadrant, fully opened to fully closed, wherein the louvers are pivoted toward the left, as shown in FIG. 1, requires that the latching relay R3 has its contacts 93, 94 and 95 made with contacts 96, 97 and 98, respectively, while relay R4 has its contacts 99, 100 and 101 made respectively with contacts 102, 103 and 104. As the sun progressively moves across the sky, the light increases and shines through the transparent gore of the dome, between the lines 34, striking the translucent tube 32, lens 33 and photocell 44. Electron emission from the photocell 44 is amplified by the tubes TU, TU1 and TU2 which releases the coils of relay R1 and R2. Release of relay coil R1 breaks its contact 105 with contact 83 while releasing the coil of relay R2 makes its contact 106 with contact 82. This energizes the coil of delay relay R10 through contact 107 made with contact 80 in relay R7 through contacts 96 and 93 of relay R2 which is connected with the coil of relay R10 by wire 108. After a five second delay, relay R10 closes and energizes the reversing relays of the power unit 87 through contacts 99 and 102 of relay R4 over wire 110, through contacts 73a and 91 of relay R8. Contact 91 is connected to point S9 in terminal block TB by wire 111, which is in turn connected with the point S9 on terminal blocks TB3 and TB2, thus completing a circuit through limit switches NC1 and NC4, energizing the coils of relays R17 and R18, whereby current from the reversing relays R16, R17 and R18 is applied to the wires 112, 113, 114b and 114c which operates the motor 65 in a louver closing direction. Current impulse received by contact 107 of relay R7 feeds through contacts 93 and 96 of relay R3 over wire 108 to relay R10 then through contacts 99 and 102 of relay R4 and over wire 110a energizes the point S14 in terminal block TB, connected with the same point in terminal block TB1, thereby completing a circuit over wire 116 through the coil of relays R13 and R14, connected to the point G by wire 117, applying current to the circuit of the motor 22 over wires 118, 119, 137 and 138 to rotate the dome to position the transparent gore portion so that the photocell 44 will be shaded wherein this closing action of the louvers will be interrupted by the decrease in the electron emission from the photocell 44 but which shading of the cell 44 will not be sufficient to cause the system to be actuated in a louver opening direction. As the sun progressively moves across the sky and light intensity again increases, the high level light control of the potentiometer E3 releases its relay R2 to make contact between its points 82 and 106 wherein the louver closing action is again repeated. If at any time, with the louvers partially closed, the light level received by the photocell 44 decreases below that level for which the control E1 is set, the relay R1 will pull in and make contact between the points 83 and 105. Points 81 and 81a being in contact completes a circuit over wire 125 through points 94 and 97 of relay R3 and to delay relay R9 over wires 126 and 127 through points 100 and 103 of relay R4 over wire 128 and through points 114a and 114 of relay R5 and over wire 130 to terminal point S4; this being connected with point S4 of terminal block TB1 completes a circuit over wire 130a through normally closed limit switch NC13 and wire 130b to energize the coil of relay R12 to make contact between the points 120—120a and 121—121a thus completing a circuit through relays R13 and R14 and the wires 118, 119, 137 and 138 to reverse the control motor 22 to rotate the dome 18 toward a light admitting position. Current applied to the point S4, in terminal block TB3, is bridged to point S11 in the same block which is connected with S11 in block TB, current then flows through the points 138 and 139 of relay R6 over wires 140 and 141 to point S10 in block TB which is connected with the point S10 in block TB3 thus energizing the coil or relay R15. Current from point S4, in block TB3, flows over wire 132 through normally closed switch NC3 and wire 132a through points 133 and 134 of relay R15 to point S12 in terminal block TB2; thus energizing the coil of relay R16 over wire 142 connected in series through switches NC5, NC2 and to the terminal G by wire 142a. Energizing the coil of relay R16 pulls the points 143 and 144 in to make with points 143a and 144a, thus completing a circuit through relays R17 and R18 over wires 112, 113, 144b and 144c to rotate the motor 65 and pivot the louvers toward an open position. Rotation of the dome 18, to position its gore toward the source of light, results in relay R1 breaking contact between its points 83 and 105 thus interrupting the circuit which stops the action.

As the power unit motor 65 is rotated in a louver opening direction, the traveling nut 89 moves toward the center of its limit of travel and when the louvers are in fully open position, as shown in FIG. 1, the traveling nut 89 will contact the normally closed limit switch NC3. Contact with this switch opens the control circuit to the reversing relay R16 thus stopping the motor. Similarly in the solar control unit, during the louver opening movement, the motor 22 rotating its shaft 23 moves the traveling nut 86 to the central portion of its limit of travel wherein the nut 86 contacts the limit switch NC13 to interrupt the circuit to the coil of relay R12 which stops the motor. A normally open limit switch NO12 is mounted adjacent the limit switch NC13, but is set enough behind the switch NC13 from the direction of louver opening travel of the nut 86, so that the action is stopped before the normally open switch NO12 closes. When the light level increases, the louver will be moved in a closing direction, as disclosed hereinabove, to maintain the desired light level within the building and this action will be repeated as is necessary to maintain the light level within the building at the desired setting. When the louvers have been rotated to a fully closed position, the traveling nuts 86 and 89, in the solar control unit and power unit, will be at their limit of movement in the louver closing direction. In the power unit 87, its traveling nut 89 will contact limit switch NC1; this switch will open the control circuit connected with point S9 of the terminal blocks TB2, TB3 and TB by wire 145 in series with the coils of relays R17 and R18 through the limit switch NC4 over wires 145a and 145b. This de-energizes the relays R17 and R18 which stops the motor 65 and the movement of the traveling nut 89. The limit switch NC4 is positioned at the opposite end of the limit of travel of the nut 89, with respect to the limit switch NC1 (FIG. 6). In the event of control malfunction and with the motor 65 operating under the control circuit, to close the louvers in a direction to open the louvers as the traveling nut 89 moves by the limit switch NC5, the nut opens the limit switch NC4 which similarly stops the motor 65. This is only a safety feature of the power unit. At the louver closing end of the travel of the nut 86 there are four limit switches mounted.

The switches NO7 and NO8 control the circuiting of the solar controlling unit impulses while the NC9 and NC—NO10 switches are safety switches and are positioned just beyond the limit of travel of the nut 86 as it moves toward these switches so that the NC9 and NC—NO10 switches will not be contacted until after the NO7 and NO8 switches have been closed.

The switch NO7 is wired in series with the switch NC9 from the hot wire L over wires 146, 146a and 146b to the point S1 in blocks TB1 and TB; thus when switch NO7 is closed a circuit is completed from the point S1 in block TB over wire 147 through the points 148 and 148a of relay R5 and the wire 149 to the coil of relay R3 which energizes this relay and sets its points 94 and 93 with points 94a and 93a, respectively. Immediately after the switch NO7 is closed, the switch NC9 is opened thus interrupting the circuit so that the relay R3 cannot be reactuated by a chatter. Switch NO8 is, also, closed by the traveling nut 86 and this switch, connected with the wire 146 and to the point S2 over wire 150, completes a circuit through point S2 in the block TB to the coil of relay R11 over wires 151a and 151b, connected with the coils of relay R6 and relay R5, respectively, for energizing the latter. Energizing the coils of relays R5 and R6 completes a series of circuits which will rotate the louvers from their direction of closing travel to an opposite quadrant wherein the louvers are positioned in substantially the same position angularly with respect to the plane of the building wall and wherein the control unit is operated to position the dome 18 in a cooperative corresponding position. Energizing relay R6 breaks the circuit between its points 138 and 139 which interrupts the circuit to the coil of relay R15 (FIG. 6) to de-energize the latter and prevent a back feed of current to the power units which operate more slowly. Releasing the coil of relay R15 interrupts the circuit through the center limit switch NC3 of the power unit 87 so that the traveling nut 89 may pass this switch without interrupting the circuits disclosed hereinabove.

Similarly the limit switches NO12 and NC13 are removed from the circuit by energizing the coils of relays R5 and R6 which interrupts the current to the points S3 and S4 in the blocks TB and TB1 so that the solar control unit traveling nut 86 may similarly pass these two switches without interrupting the circuit as described hereinabove. Limit switch NO14, in the control unit 16, is connected with the hot wire 146 and to the point S6 in the block TB1 by wire 152 which is in turn connected by a wire 152a and through points 114b—148a of the relay R5 and then to the coil of relay R3 by the wire 149 while the points 153 and 153a of relay R5, connected with the wire 152a, are in turn connected to the coil of relay R4 by wire 154; thus closing of the switch NO14 completes a circuit for energizing the coils of relays R3 and R4. During the louver reversing action, there is no control for stopping this action of the system by any means, either the manual push button or solar control. This louver reversing action is completely an automatic function which continues until the traveling nut 89 of the power unit opens the limit switch NC5 to deenergize the relay R16. The traveling nut 86 of the solar control unit contacts and closes the switch NO14 and opens the switch NC15. Closing the switch NO14 energizes the coils of relays R3 and R4 as is disclosed hereinabove.

The switch NC15 is connected in series by wires 155 and 155a with the points S7 and S8 of the blocks TB1 and TB. The point S8, in the block TB, is connected by wires 128 and 128a through points 114a and 114c of relay R5 to the point S13 in block TB by a wire 156. Interruption of this current by opening the switch NC15 interrupts the circuit to the coil of relay R12 connected to the point S13 and the block TB1 by wire 156a thus stopping the dome reversing action of the motor 22.

When the switch NC5, in the power unit 87, is opened by the traveling nut 89, interrupting the circuit through this switch and the relay R16, the reversing action of the louvers controlled by the motor 65 is interrupted. The switch NC5 is connected in series with the switch NC2 as disclosed hereinabove and acts as a safety feature in a manner similar to that described for the switch NC4. When the switch NO14 has been closed, in the solar control unit, the coil of the relay R3 is energized and makes contact between its points 93—96; 94—97 and 95—98, while energizing the coil of relay R4 makes contact between its points 99—102; 100—103 and 101—104; this interrupts the back feed holding circuit to the coils of relays R5 and R6 by breaking contact between the points 94 and 94a in relay R3. Releasing the coils of relays R5 and R6 returns the control to the relays R1 and R2 operated by the electronic emission of the photocell 44, if on solar control, or, to the push button switches SW3 and SW4, if positioned on manual control. If at the time this louver reversing action was interrupted the controls are under operation of the photocell 44, and if the light level or intensity is above the desired setting, the relay R2 would be operated to cause the motors to move in a louver closing or light reducing action and in the same direction of travel during the louver reversing procedure just described; the traveling nut 86, contacting the switch NC15, will open the circuit through this switch and stop this action.

It will be noted that during the louver reversing action relay R3 has contacts made between its points 93—93a; 94—94a and 95—95a so that the delay relay R9 is out of circuit and cannot be energized; then when contact is made between the points 93—96; 94—97 and 95—98 in relay R3 the delay relay R9 will not supply energy to the system until after its five second delay. This feature is to prevent overrunning or overtravel of the system in event that the light level was very low at the time that the louver reversing procedure closed the normally open switch NO14. With the latching relays R3 and R4 set, as described in the above operation and the light level intensity contacting the photocell 44, decreasing, the relay R1 will be energized to rotate the louvers 14 toward fully opened position. If the light intensity should rise at any time after the louvers have been partially open, due to a decrease of light intensity, the louvers will be closed, or, in other words, moved to the fully reversed position; this action will be stopped by the switch NC15 which is opened just before the switch NO14 is closed which prevents resetting of the latching relays. When the light intensity decreases progressively, the louvers will be rotated toward an open position until the traveling nut 86, in the solar control unit, closes the switch NO12 at the cener of its travel. This will re-energize relay R4 to set its contacts in the position occupied at the start of operation. Switch NO12 is wired through contacts 101—104 of relay R4 over wire 160 connected with point S5 in the blocks TB1 and TB, thus preventing chatter from getting this relay out of cycle with the system. If the traveling nut 89 of the power unit has not reached the center switch NC3, when the switch NO12 closes, to switch the relay R4, the circuit is switched from the point S9 to S4 in the blocks TB, TB2 and TB3 which switches the relays R17 and R18 of the power motor 65, but, in as much as this change of current is instantaneous, the motor does not stop nor reverse but continues to move the louvers 14 in the same direction until the traveling nut 89 contacts the switch NC3 which interrupts the current and stops the action in the louver power unit. There are two limit switches NC—NO10 and NC—NO11 positioned at opposing ends of the travel of the nut 86 and positioned outwardly of the control switches NO7 and NO8 and NO14—NC15, respectively. The function of these switches NC—NO10 and NC—NO11, which are connected in series between the hot wire 146 and the points C2 of blocks TB1 and TB by a wire 161 and to the coil or relay R7 over wire 162 is to energize the coil of relay R7. Energizing the coil of relay R7 makes contact between its points 76—81a, 75—107, which removes control of the system from solar control and places it under control of the manually operated open and close switches SW3 and SW4. This stops all automatic functions of the system and to clear this stoppage it is only necessary to move the traveling nut 86 out of contact with the respective limit switch NC—NO10 or NC—NO11 by closing the proper switch SW3 or SW4 to rotate the solar control motor 22 in a direction to move the traveling nut out of contact with the limit switch. The brake applied to the control motor 22 permits operation of the motor to revolve the shaft 23 one or two more revolutions than the rotation of the shaft 88, by the power unit motor 65, during the operation of each of the motors; this braking action assures that the traveling nut 89 of the power unit will be positioned on its respective limit switch and stopped before the traveling nut 86 of the solar control unit reaches its limit switch. This feature assures that at each end of the respective louver opening or closing action and at the center of travel of the traveling nuts 86 and 89, the power unit and solar control unit will be synchronized. At any time that the operation of the system is changed from solar control, for positioning the louvers by operating the push buttons SW3 and SW4 or under mechanical control, all that is necessary to again put the system under solar control is to open the switch SW2, or, if the system has been under mechanical control, close the switch 90 and then open the switch SW2. Intensity of light then received by the photocell 44 will operate the relays R1 and R2 until the position of the louvers satisfies the demands of light intensity setting of potentiometers E1, E2 and E3 at which time louver movement is stopped or resumed as is necessary to maintain the predetermined light intensity within the building; this may cause the controls to be actuated through a complete cycle or for only a very small adjustment of the louvers.

Another feature of the operation of the system is that, if during the louver operating movement, in the second quadrant or position occupied after being reversed, as disclosed hereinabove, the light intensity should fall to a very low point, the louvers will be rotated to a fully opened position, then if the light intensity rises to a point which should rotate the louvers to close toward the reverse position, the control will be actuated to close and then reverse to an opposite position, with respect to the wall, and after being fully reversed, to be rotated toward an open position until the light intensity level within the building has been satisfied.

Obviously the invention is susceptible to some change or alteration without defeating its practicability, and I therefore do not wish to be confined to the preferred embodiment shown in the drawings and described herein, further than I am limited by the scope of the appended claims.

I claim:

1. A solar controlled apparatus comprising: a base member; a hemispherical dome pivotally mounted for rotation about a vertical axis on said base, said dome having a transparent wall portion; a photoelectrical cell secured within said dome; a reversible electric motor mounted on said base; a drive shaft connected at one end with said motor; a traveling nut on said drive shaft, said nut progressively moved in opposing directions by the respective direction of rotation of said motor; a gear train connected at the other end of said drive shaft, said gear train having a pinion; a rack engaged with said pinion intermediate its ends and pivotally connected at one of its ends with said dome for rotating the latter in response to the respective direction of rotation of said motor; a source of electrical energy connected with said cell and said motor; and current amplifying means interposed between said cell and said motor for maintaining a predetermined level of light intensity within said dome, said current amplifying means including, a thermionic amplifying tube, first and second thermionic tubes connected with said thermionic tube and said cell, first and second relays connected with said first and second thermionic tubes, respectively, said first and second thermionic tubes rendered operative by the respective high and low level of radiation intensity from the light source received by said cell, a pair of latching relays operated by said first and second relays for energizing said motor for rotating said dome and positioning the transparent wall portion toward a light admitting or photocell shading position, a pair of triple-pole double-throw relays connected with said latching relays, limit switches mounted adjacent the traveling nut on the drive shaft of said motor and connected with the last mentioned relays limiting the rotation of said motor in respective directions by completing a circuit, when closed by said traveling nut, through said latching relays and the last mentioned relays and said current amplifying means for changing the direction of rotation of said motor to pivot said dome an angular distance substantially equal to the width of the transparent wall portion.

2. A solar controlled apparatus, comprising: a base member; a dome-like housing pivotally mounted on said base, the wall of said housing having a transparent portion; a photoelectric cell within said housing; a reversible electric motor mounted on said base and drivably connected with said housing for rotating the latter in response to the respective direction of rotation of said motor; a source of electrical energy connected with said cell and said motor; and current amplifying means interposed between and connected with said cell and said motor for maintaining a predetermined level of light intensity within said housing, said current amplifying means including, a thermionic amplifying tube connected with said cell, first and second thermionic tubes connected with said cell and said thermionic amplifying tube, first and second relays connected with said first and second thermionic tubes, respectively, said first thermionic tube interrupting a circuit of said first relay in response to the high level of radiation intensity from the light source received by said cell by releasing said first relay, said second thermionic tube interrupting a circuit of said second relay in response to the low level of radiation intensity from the light source received by said cell releasing said second relay, a pair of latching relays operated by said first and second relays for energizing said motor and rotating said housing to position the transparent wall portion toward a light admitting or photocell shading position when both said first and second relays are simultaneously released or energized, said latching relays coacting to de-energize said motor when either one of said first and second relays are released or energized in opposition to the other one in response to the respective high or low level of electron emission from said cell through said first and second thermionic tubes.

3. A solar controled apparatus comprising: a base member; a hemispherical dome pivotally mounted for rotation about a vertical axis on said base, said dome having a transparent wall portion; a photoelectrical cell secured within said dome; a reversible electric motor mounted on said base; a drive shaft connected at one end with said motor; a gear train connected at the other end of said drive shaft, said gear train having a pinion; a rack engaged with said pinion intermediate its ends and pivotally connected at one of its ends with said dome for rotating the latter in response to the respective direction of rotation of said motor; a source of electrical energy connected with said cell and said motor; and current amplifying means interposed between said cell and said motor for maintaining a predetermined level of light intensity within said dome, said current amplifying means including, a thermionic amplifying tube connected with said cell, first and second thermionic tubes connected with said thermionic amplifying tubes and said cell, first and second relays connected with said first and second thermionic tubes, respectively, said first thermionic tube interrupting the current and releasing said first relay in response to the high level of radiation intensity from the light source received by said cell, said second thermionic tube interrupting the current and releasing said second relay in response to the low level of radiation intensity from the light source received by said cell, a pair of latching relays operated by said first and second relays, said latching relays energizing said motor and rotating said dome an angular distance not greater than the width of the transparent wall portion for increasing or decreasing the radiation intensity received by said cell when both said first and second relays are simultaneously released or energized.

References Cited in the file of this patent

UNITED STATES PATENTS

| | | |
|---|---|---|
| 2,070,178 | Pottenger et al. | Feb. 9, 1937 |
| 2,198,488 | Smith | Apr. 23, 1940 |
| 2,867,393 | Burley | Jan. 6, 1959 |
| 2,885,565 | Davis | May 5, 1959 |
| 2,913,583 | Regnier et al. | Nov. 17, 1959 |
| 2,917,795 | Brown | Dec. 22, 1959 |
| 2,962,647 | Borenstein | Nov. 29, 1960 |